United States Patent [19]
Vandekerckhove et al.

[11] Patent Number: 6,087,020
[45] Date of Patent: Jul. 11, 2000

[54] FILM HAVING LOW PERMEABILITY TO HYDROCARBONS

[75] Inventors: Franck Vandekerckhove, Meulebeke, Belgium; Alain Bouilloux, Bernay, France; Régis Jacquemet, Evreux, France; Bruno Echalier, Paris, France

[73] Assignee: Elf Atochem S.A., Puteaux, France

[21] Appl. No.: 08/784,686

[22] Filed: Jan. 22, 1997

[30] Foreign Application Priority Data

Jan. 23, 1996 [FR] France .................................. 96 00735

[51] Int. Cl.⁷ .......................... B32B 27/34; B32B 27/32; C08L 67/00
[52] U.S. Cl. .................... 428/476.1; 428/476.9; 525/66; 525/179
[58] Field of Search ............... 428/476.1, 476.9

[56] References Cited

U.S. PATENT DOCUMENTS

| | | | |
|---|---|---|---|
| 4,444,829 | 4/1984 | Bollen | 525/183 |
| 4,588,648 | 5/1986 | Krueger | 428/476.1 |
| 5,106,692 | 4/1992 | Shigemoto | 428/412 |
| 5,114,765 | 5/1992 | Inada | 526/66 |

FOREIGN PATENT DOCUMENTS

| | | |
|---|---|---|
| 2102054 | 5/1994 | Canada . |
| 57-53353 | 3/1982 | Japan . |
| 57-59720 | 10/1982 | Japan . |
| 3-231812 | 10/1991 | Japan . |
| WO 91/15538 | 10/1991 | WIPO . |

*Primary Examiner*—David Buttner
*Attorney, Agent, or Firm*—Pennie & Edmonds LLP

[57] ABSTRACT

The invention provides a film having low permeability to hydrocarbons comprising at least one layer (i) formed of a polyamide/polyolefin alloy having a polyamide matrix and at least one layer (ii) formed of a polyolefin. The invention also provides a release film for a sheet molding compound consisting of said film, as well as a packaging for expandable polystyrene formed of said film.

7 Claims, No Drawings

6,087,020

FILM HAVING LOW PERMEABILITY TO HYDROCARBONS

The present invention relates to a novel film having a low permeability to hydrocarbons, and more particularly to a novel release film, or peel-off film, for a sheet molding compound referred to hereunder by its common abbreviation SMC, as well as to a new film for packaging of expandable polystyrene.

SMCs are used in making manufactured parts both in the automobile field (fenders, hatchback doors etc.) as well as in the nautical field (hulls of boats), in electronics (equipment cases) or in the sanitary field.

The SMC is generally composed of a cross-linkable polymeric resin, in particular an unsaturated polyester or an epoxy resin, of reinforcing fillers such as glass fibers, as well as smaller or larger amounts of other additives.

The SMC is normally prepared by depositing fibers on a layer of unsaturated polyester resin which itself is supported on a movable film generally composed of polyethylene or polyamide or an alloy of these polymers. A further film of the same nature is then placed on top of the resin/reinforcing filler system in order to form a composite sandwich-structure mass between the two films. The sandwich structure then passes through a series of kneading and compacting rollers and is generally wound in the form of large rolls.

The SMC is then stored for subsequent transformation. During the storage period, the polyester resin partially cross links, leading to an increase of SMC viscosity until its consistency renders it suitable for molding.

SMC users, generally molders, cut off a piece of appropriate size from the roll, peel off the support films and insert the SMC into a heated mold for simultaneous transformation and full curing. Thus, composite sandwich-structure SMC masses are readily applied in techniques using compression molding.

Up until now, three main properties were looked for. Firstly, the release film should have very low styrene permeability. Next, the release film should be easy to peel, in particular using automatic de-filming processes. Finally, the release film should also exhibit very low moisture take-up and permeability to water.

The use of polyethylene as release films has been proposed. If peelability and inertness vis-a-vis water are satisfactory, styrene permeability is too high.

The use of polyamide films as release films has also been proposed. Although styrene permeability properties are satisfactory, inertness vis-a-vis water, and peelability, are not satisfactory.

The use of release films based on polyamide and polyolefin has been proposed as a way of achieving the above objects. Thus, EP-A-0,027,191, GB-A-2,225,583 as well as EP-A-0,506,515 disclose release films based on polyamide and polyolefin, in particular based on alloys of such polymers, with variable relative proportions.

Moreover, during SMC manufacture, it is often necessary to weld the lower and upper films at their edges, in order to prevent styrene loss and water penetration during storage. One therefore looks for films having good welding properties.

Additionally, SMC manufacturers also produce film scrap, notably during the start-up phases and it would also be desirable for release films to be perfectly recyclable in order to limit waste.

However, to date, none of the cited films of the prior art fulfil welding and recyclability criteria while preserving the basic requirements looked for (low styrene permeability, good peeling properties and low water permeability).

The problems that are faced in the field of SMCs are also partially faced in the field of packaging of expandable polymers, specifically expandable polystyrene. Indeed, the film forming the package containing balls (or granules) of polystyrene with pentane must be gas-tight. This gas-tightnes is dictated in order (i) to avoid any loss of pentane in the balls during storage or shipping and particularly (ii) to avoid any leakage of pentane, causing fires (the flash point of pentane is −17° C.). Further, it is also desirable that the film forming the package be weldable, as well as able to be recycled.

The invention thus provides a new film having a low permeability to hydrocarbons.

The present invention thus more specifically provides an SMC release film having these basic properties, which is easy to weld and recycle and which additionally is readily put in film form, said film being one of the embodiments of the present invention.

The present invention also more specifically provides a film for packaging expandable polymers, especially expandable polystyrene, comprising said film according to the invention.

Thus, the invention provides a film comprising at least one layer (i) formed of a polyamide/polyolefin alloy having a polyamide matrix and at least one layer (ii) formed of a polyolefin.

According to one embodiment, the film according to the invention comprises a central layer (i) formed of said polyamide/polyolefin alloy and two outer layers (ii) and (iii) formed of polyolefin.

In another embodiment, the film according to the invention comprises one layer (i) formed of said polyamide/polyolefin alloy and one layer (ii) formed of a polyolefin, the polyolefin layer thus being disposed on a single side of said alloy.

According to yet a further embodiment, in the film according to the invention, said polyolefin layer or said polyolefin layers consist(s) of two or several polyolefin sub-layers.

In another embodiment, the film according to the invention, comprises one or several layers of a binder between said polyamide/polyolefin alloy and polyolefin layers. Examples of this embodiment can for example be a film consisting of polyolefin/binder/alloy/binder/polyolefin or of alloy/binder/polyolefin.

In the embodiments indicated above, contact between the peelable release film and the SMC is achieved either by the alloy, or by the polyolefin.

Similarly, in the embodiments indicated above, contact between the film and the expandable polymer is achieved either by the alloy, or by the polyolefin.

In one embodiment, in the film according to the invention, said polyamide/polyolefin alloy is an alloy comprising components A, B, C and D in the following weight percentages:

30<A+B+C<60 ; A+B+C+D=100;
0<A<60 ; 0<B<60 ; 0<C<60;
said components A, B, C and D having the following compositions:

A consists of at least one polyolefin composed of a fully or partially linear alpha-olefin having a molecular weight of between 1,000 and 1,000,000, said olefin being optionally functionalized;

B is the alpha-olefin described in A onto which one or several functionalized monomer(s) are grafted or copolymerized, the grafting or copolymerization rate of the functionalized monomer(s) being comprised between 500 ppm and 6% by weight;

C is a grafted copolymer consisting of at least one mono-amino oligomer of polyamide and a polymer or copolymer of alpha-mono-olefin on which a monomer able to react with the amino function of said mono-amino oligomer has been grafted;

D consists of at least one (co)polyamide consisting of a polyamide obtained from carboxylic aliphatic acid(s) and one or several aliphatic diamines each having between 6 and 24 carbon atoms and/or a polyamide obtained from one or several amino-aliphatic acids or lactam(s) having 6 to 24 carbon atoms.

In a further embodiment, in the film according to the invention the polyamide in said polyamide/polyolefin alloy is polyamide PA-6 and/or PA-6,6.

In yet a further embodiment, in the film according to the invention, the polyolefin in said polyamide/polyolefin alloy is polyethylene and/or polypropylene.

In yet a further embodiment, in the film according to the invention, the polyamide/polyolefin alloy comprises an agent ensuring compatibility consisting of a maleic grafted copolymer of ethylene and (meth)acrylic acid or alkyl (meth)acrylate.

According to yet a further embodiment in the film according to the invention said polyamide/polyolefin alloy is selected from the following alloys:

an alloy comprising, in % by weight, 55 to 70% PA-6, 5 to 15% of an ethylene/propylene copolymer with a majority of polypropylene, grafted with maleic anhydride then condensed with mono-amino oligomers of caprolactam; made up to 100% with polypropylene;

an alloy comprising, in % by weight, 55 to 70% PA-6, 5 to 15% of at least one ethylene copolymer with (i) alkyl (meth)acrylate or an unsaturated carboxylic acid vinyl ester and (ii) an unsaturated carboxylic acid anhydride or an unsaturated epoxy, monomer (ii) being grafted or copolymerized; made up to 100% with polyethylene;

an alloy comprising, in % by weight, 55 to 70% PA-6; 5 to 15% polyethylene or copolymers of ethylene and an alpha-olefin grafted with maleic anhydride or glycidyl methacrylate; made up to 100% with polyethylene.

According to yet a further embodiment, in the film according to the invention the polyolefin of said alloy and the polyolefin of said layer or layers (ii) and/or (iii) are substantially identical.

According to a further embodiment, in the film according to the invention, the polyolefin of the layer or layers (ii) and/or (iii) is polyethylene.

According to yet a further embodiment, in the film according to the invention the polyolefin of the layer or layers (ii) and/or (iii) is polyethylene containing maleic grafted polyethylene or a maleic grafted ethylene copolymer. In this embodiment, the weight proportions of respectively polyethylene and maleic grafted polyethylene or maleic grafted ethylene copolymer can vary over a wide range, for example between 95/5 and 50/50, preferably between 90/10 and 70/30.

The fact of using mixtures of the above constituents, such as mixtures of the alloys, mixtures of the polyolefins, etc. also falls under the scope of the invention.

The invention also provides a sandwich structure comprising a central sheet molding compound layer of uncured and reinforced thermosetting sheets and two outer layers of a film according to the invention.

The invention further provides a method for producing a sheet molding compound comprising the steps of:

(a) casting, in fluid form, a layer of thermosetting resin over release film for a sheet molding compound comprising at least one layer (i) formed of a polyamide/polyolefin alloy having a polyamide matrix and at least one layer (ii) formed of a polyolefin, while continuously advancing said film;

(b) introducing a reinforcing material over said advancing fluid layer;

(c) placing a film of the invention in contact with an upper surface of said reinforced fluid layer thereby forming a composite sandwich-structure mass;

(d) passing said composite sandwich-structure mass through a series of kneading and compacting rollers; and (e) winding said sandwich-structure composite mass into a roll.

The invention will be described in more detail below.

In this present application, the term "polyamide" stands for the condensation products:

of one or several alpha-omega-amino-acids such as those containing more than 5 carbon atoms, for example from 6 to 12 carbon atoms; examples of such amino acids are aminocaproic, amino-7-heptanoic, amino-11-undecenoic and amino-12-dodecanoic acids; or of one or several lactams corresponding to the above amino-acids; examples of such lactams are caprolactam, oenanlactam and lauryllactam; or of one or several substantially stoechiometric combinations of one or several aliphatic and/or cycloaliphatic and/or aromatic-aliphatic diamines, or salts thereof, with one or several aliphatic or aromatic carboxylic diacids or salts thereof; examples of such diamines are hexamethylene-diamine, dodecamethylene-diamine, metaxylylene-diamine, bis(4-aminocyclohexyl)-methane (BACM), bis(3-methyl-4-amino-cyclohexyl)-methane (BMACM) and trimethylhexamethylenediamine, and examples of diacids being terephthalic, isophthalic, adipic, azelaic, sebacic, suberic and docedanedicarboxylic acids; or any mixture of the above monomers; and any mixture of the resulting condensation products, optionally with other polymers compatible with the polyamides.

By way of example, the polyamide is PA-6,10, PA-11, PA-12, PA-6,12, PA-12,12, PA-6/12 (a copolymer of caprolactam and lauryl lactam). The molecular weight of the polyamides can vary greatly, as those skilled in the art will understand.

Here, the term "polyolefin" covers homopolymers or copolymers of alpha-olefins or di-olefins.

Such olefins are, by way of example, ethylene, propylene, butene-1, octene-1, butadiene.

The following can be mentioned as typical examples:

polyethylene PE, polypropylene PP, copolymers of ethylene and alpha-olefins. Such polymers can be grafted with unsaturated carboxylic acid anhydrides such as maleic anhydride or unsaturated epoxides such as glycidyl methacrylate.

copolymers of ethylene with one or several products selected from: (i) unsaturated carboxylic acids and salts or esters thereof; (ii) saturated carboxylic acid vinyl esters such as vinyl acetate; (iii) unsaturated dicarboxylic acids and salts, esters, hemiesters, anhydrides thereof; and (iv) unsaturated epoxides. These ethylene (co)polymers can be grafted with unsaturated carboxylic acid anhydrides or unsaturated epoxides.

styrene-based block copolymers, and notably those comprising polystyrene and polybutadiene sequences (SBS), polystyrene and polyisoprene sequences (SIS), polystyrene and poly(ethylene-butylene) sequences (SEBS), such copolymers being optionally functionalized with maleic anhydride.

The above copolymers can be randomly copolymerized or sequenced, and have a linear or branched structure.

The term polyolefin also covers mixtures of several of the polyolefins mentioned above.

One can, for example, use:

polyethylene (HDPE, MDPE, LDPE or VLDPE), polypropylene, ethylene/alpha-olefin copolymers, ethylene/vinyl acetate (EVA) copolymers, copolymers of ethylene/alkyl (meth)acrylate/grafted or copolymerized maleic anhydride, copolymers of ethylene/alkyl (meth)acrylate/grafted or copolymerized glycidyl methacrylate.

The molecular weight of the polyolefins can vary over a wide range as will be understandable to those skilled in the art.

For example, the molecular weight can be comprised between 1,000 and 1,000,000.

In this present description, the expression polyamide/polyolefin alloy with a polyamide matrix stands for products comprising a polyamide as described above, a polyolefin as described above and when the later does not contain sufficient functionality to ensure establishment of compatibility with the polyamide, a compatibility-ensuring agent; the polyolefin is present in the form of a dispersed phase in the polyamide phase which is thus referred to as the polyamide matrix.

The polyamide/polyolefin ratio in the alloy can vary over a wide range, as those skilled in the art will understand.

For example, the polyamide may represent 25 to 75%, advantageously 30 to 70% and more particularly 50 to 70% by weight of the alloy.

The compatibility-ensuring agent is present in an amount sufficient to ensure compatibility, in other words dispersion of the polyolefin in the polyamide matrix in the form of nodules. Nodules diameter can be 0.1 to 5 μm.

For example, the compatibility-ensuring agent can represent up to 25% by weight of the alloy.

The agent ensuring compatibility is a product known per se for rendering polyamides and polyolefins compatible.

Examples of compatibility-ensuring agents are:

polyethylene, polypropylene, ethylene/propylene copolymers, ethylene/hutene copolymers, all these products being grafted with maleic anhydride or gycidyl methacrylate;

ethylene/alkyl (meth)acrylate/maleic anhydride copolymers, the maleic anhydride being grafted or copolymerized;

ethylene/vinyl acetate/maleic anhydride copolymers, the maleic anhydride being grafted or copolymerized;

the two above copolymers in which anhydride is replaced fully or partly by glycidyl methacrylate;

ethylene/(meth)acrylic acid copolymers and optionally their salts;

ethylene/alkyl (meth)acrylate/glycidyl methacrylate copolymers, the glydidyl methacrylate being grafted or copolymerized;

grafted copolymers constituted by at least one monoamino oligomer of polyamide and of an alpha-monoolefin (co)polymer grafted with a monomer able to react with the amino functions of said oligomer; Such alloys or agents ensuring compatibility are described in, among others, FR-A-2,291,225, EP-A-0,342,066 and EP-A-0,218,665 which are incorporated herein by reference.

Elastomers such as EPR or EPDM, both functionalized with maleic anhydride and others can be conventionally added to these alloys.

The expression "substantially identical polyolefins" indicates that their respective physical, and/or chemical and/or physicochemical properties are close. For example, two homopolymers of the same monomer are substantially identical when their respective molecular weights are comparable. As a further example, a homopolyolefin is substantially identical to a copolyolefin when the co-monomer of the latter is present in a small amount. As a further example, two low density PEs (LDPE) are substantially identical as are two high density PEs (HDPE), two linear low density PEs (LLDPE) or again two very low density PEs (VLDPE).

In this application, the term "binder" means products commonly referred to as co-extrusion binders, thermoplastic binders, hot melt bonding agents etc.

As examples, copolyolefins modified with an unsaturated carboxylic acid derivative (modification being by copolymerization, terpolymerization or grafting) can be mentioned. Certain of the above polyolefins can also be used as a binder, provided their functional group content is sufficient to ensure the layers bond to each other. Mixtures of binders are also appropriate.

Examples of such binder compositions are provided in the following patents, this list not being exclusive: EP-0,210,307, EP-0,033,220, EP-0,266,994, FR-2,132,780, EP-0,171,777, U.S. Pat. No. 4,758,477, U.S. Pat. No. 4,762,890, U.S. Pat. No. 4,966,810, U.S. Pat. No. 4,452,942, U.S. Pat. No. 3,658,948.

Examples of coextrusion binders are:

copolymers of ethylene copolymerized with butene, hexene, octene, optionally mixed with ethylene-propylene copolymers, grafted with maleic anhydride, said ethylene/alpha olefin copolymers containing from 35 to 80% by weight of ethylene, the degree of grafting of maleic anhydride being comprised between 0.01 and 1 by weight, preferably between 0.05 and 0.5% based on the total copolymer weight;

copolymers of ethylene and vinyl acetate (EVA), with or without maleic anhydride (the maleic anhydride can be grafted or terpolymerised), particularly containing up to 40% by weight of vinyl acetate, from 0.01 to 1% by weight of grafted maleic anhydride or from 0.1 to 10% by weight of terpolymerised maleic anhydride, based on the total copolymer weight;

copolymers of ethylene and alkyl (meth)acrylate (such as methyl, ethyl, t-butyl acrylate) and of maleic anhydride containing up to 40% by weight of alkyl (meth)acrylate and from 0.01 to 10% by weight of maleic anhydride based on the total copolymer weight.

The term "hydrocarbons" as used in the instant invention means any aliphatics or aromatics, optionally halogenated. Examples of such hydrocarbons are: propane, butane, pentane, hexane, cyclopentane, cyclohexane, octane, dichlorodifluoromethane, trifluorochloromethane, 1,1,1-difluorochloroethane and styrene, these hydrocarbons, except styrene, being conventional blowing agents in the field of expandable polystyrene. Penzane and styrene are the hydrocarbons to which most interest will be given in the instant description.

The term "low permeability" as used in the instant invention means that the permeability to a given hydrocarbon is below a threshold value commonly assigned in the art of interest. For example, the threshold value for styrene permeability in the SMC release film field is $200 \times 10^{-9}$ g.cm/cm$^2$/h, such as mesured using the method described in "American Institute of Chemical Engineer, 53rd National Meeting", Preprint No.32d (1964), by Bixler and Michaels. The threshold value will be function of the technical field of concern.

The films according to the invention, which are multi-layer, can be obtained by conventional methods, specifically co-extrusion.

Each layer of the multi-layer film according to the invention can contain conventional additives, such as anti-static, anti-blocking additives, etc.

Moreover, additional layer may be present in the multi-layer films.

In the multi-layer films for use as a release film, thickness is comprised over a wide range as those skilled in the art will understand, for example between 5 and 300 µm, preferably between 10 and 50 µm. In the multi-layer films for use as a packaging film, thickness is comprised over a wide range as those skilled in the art will understand, for example between 30 and 150 µm, preferably between 50 µm and 80 µm.

Moreover, the proportions of the various layers, expressed as a percentage of final release film thickness, can also vary over a wide range as those skilled in the art will understand, for example, the polyamide alloy/polyolefin ratio can be comprised between 9/1 and 1/9, advantageously between 3/1 and 1/3, preferably between 1/2 and 2/1. If a binder is present, it can represent up to 30%, advantageously up to 20% of final thickness.

The following examples illustrate the invention Without limiting it.

EXAMPLE 1

A three-layer film is prepared, the central layer being the alloy and the outer layers being a polyolefin. The alloy is an alloy marketed by Elf Atochem under the name Orgalloy which is a PA6/PE/terpolymer alloy, consisting, by weight, of 65% PA6 of MI=15–17, 25% HDPE and 10% of an ethylene/butyl acrylate/maleic anhydride copolymer in which the weight ratio is 90.9/6.0/3.1 and MI=5 (190° C., 2.16 kg).

The polyolefin is a 80/20 by weight mixture of LDPE marketed by BASF, and a copolymer of LLDPE/EPR functionalized with maleic anhydride, marketed by Elf Atochem under the name Orevac. The respective thicknesses of each layer, in µm, were 6/12/6.

The release film is obtained using conventional equipment; typically, a three-layer extruder with a 150 mm die, a 0.7 mm gap, a draw speed of 9 m/min, a swelling ratio of 2.1 for a flat width of 500 mm; typical temperatures of 210 to 250° C. are used for the PE, and 240 to 260° C. for the alloy.

EXAMPLE 2

The conditions are the same as in example 1, except that the LDPE is replaced by MDPE, marketed by Fina.

EXAMPLE 3

The conditions are the same as in example 2, except that the respective thicknesses of each layer are now, expressed in µm, 6.5/14/6.5.

EXAMPLE 4

A dual-layer film is produced, the alloy being the same as in examples 1 to 3, and the polyolefin being identical to that in examples 2 and 3. The respective thicknesses of each layer are, in µm, 12/12. Extrusion conditions are the same as in examples 1–3, except that the extruder is a dual-layer extruder.

EXAMPLE 5

The conditions are the same as in example 1, except that the polyolefin is MDPE marketed by Fina; extrusion conditions are the same as in examples 1 to 3.

EXAMPLE 6

The conditions are the same as in example 5 except that the polyolefin is a 80/20 by weight mixture of MDPE, marketed by Fina and a copolymer of LLDPE/EPR functionalized with maleic anhydride marketed by Elf Atochem under the name Orevac.

EXAMPLE 7

The conditions are the same as in example 6 except that the 20% by weight of LLDPE/EPR functionalized with maleic anhydride copolymer are replaced by the same amount of a terpolymer of ethylene/acrylic ester/maleic anhydride (9% maleic) marketed by Elf Atochem under the name Lotader.

EXAMPLE 8

The conditions are the same as in example 6 except that the MDPE of Fina is replaced by LDPE marketed by Elf Atochem under the name Lotader.

EXAMPLE 9

A three-layer film is provided comprising, in the following order, a first layer of the alloy of examples 1–8, a layer of the polyolefin of example 2, and a layer of the polyolefin of example 5.

The other operating conditions of the extruder are identical to those in example 5.

EXAMPLE 10

A single-layer film is provided conforming to example 2 in European Patent Application 0,506,515, which is an alloy based on PA-6 and PP. Thickness is 22 µm and extruder operating conditions are the same as those in example 1.

EXAMPLE 11

A single-layer film of PA-6 is provided. Thickness is 22 µm, the extruder operating conditions being the same as Those in example 1.

Certain properties of the films in the preceding examples are measured: tensile strength and elongation are determined according to ASTM D882, dart drop perforation resistance according to ASTM 1709, tear strength (Elmendorf) according to ASTM 1922, and yield stress in accordance with ASTM D882.

The results are given in the table below, SL and ST respectively standing for the longitudinal and transverse directions.

These results show that films according to the invention are highly suitable, from a mechanical point of view, for application as peelable SMC release films. Moreover, styrene and water vapour permeability properties as well as weight takeup (23° C. and 100% relative humidity) were determined, showing no deterioration either of the film or of the polyester sandwich structure under normal conditions of use and storage.

Moreover, weldability of the films was measured, the results of measurements carried out in line with prior art on film welding demonstrating their suitability for welding.

Finally, suitability of the films to be recycled was determined. The films in examples 3, 4 and 5 were cut up and ground into flakes in a Pallman mill. This was a hollow-rotor six-blade, three of which were fixed, mill. The flakes obtained had a straight section with an associated appearance of fragmentation. These flakes were baked at 60° C. for 24 hours to drive out all traces of residual moisture which could lead to the formation of small bubbles. Next, the dried flakes were extruded with PE in a Kaufman extruder, under the following operating conditions: die diameter: 150 mm, gap: 0.8 mm; draw speed: 9 m/min; swelling ratio: 2.12; flat tube width: 500 mm. The Kaufman extruder temperature All films according to the invention of the previous examples show a styrene permeability below the specified threshold, i.e. $200 \times 10^{-9}$ g.cm/cm$^2$/h, more particularly below $50 \times 10^{-9}$ g.cm/cm$^2$/h.

EXAMPLE 12

The films according to the invention of the previous examples are used for preparing packaging for granules of expandable polystyrene, the thickness of the film being however adjusted to 50μm. Pentane permeability is measured, and is about 0.7 g/m$^2$/24 hrs.

Obviously, the present invention is not limited to the embodiments described but may be subject to numerous variations readily accessible to those skilled in the art.

| Example | Dimensions width (mm) | thickness (μm) | Tensile strength (N) SL | ST | Elongation (%) SL | ST | Perforation resistance (g) Dart Drop | Tear strength (mN) SL | ST | Yield stress (N) ST | ST |
|---|---|---|---|---|---|---|---|---|---|---|---|
| 1; 80/20 LDPE+Orevac/Orgalloy/80/20 LDPE+ Orevac | 1580 | 24 | 20.4 | 13.9 | 389 | 491 | 245 | 81 | 900 | 8.8 | 8.5 |
| 2; 80/20 MDPE+Orevac/Orgalloy/80/20 MDPE+ Orevac | 1580 | 24 | 17.5 | 14.4 | 304 | 523 | 50 | 91 | 633 | 10.8 | 10.8 |
| 3; 80/20 MDPE+Orevac/Orgalloy/80/20 MDPE+ Orevac | 1580 | 27 | 20.2 | 16.7 | 348 | 577 | 74 | 103 | 827 | 11 | 11.3 |
| 4; 80/20 MDPE+Orevac/Orgalloy | 1580 | 24 | 17.2 | 12.8 | 322 | 433 | 50 | 92 | 747 | 9.8 | 9.8 |
| 5; MDPE/Orgalloy/MDPE | 395 | 26 | 15.9 | 12.7 | 370 | 448 | 50 | 130 | 733 | nd | nd |
| 6; 80/20 MDPE+Orevac/Orgalloy/80/20 MDPE+Orevac | 395 | 25.8 | 18.8 | 14.2 | 408 | 433 | 50 | 173 | 773 | nd | nd |
| 7; 80/20 MDPE+Lotader/Orgalloy/80/20 MDPE+Lotader | 400 | 24.5 | 15.3 | 10.6 | 293 | 379 | 50 | 125 | 687 | nd | nd |
| 8; 80/20 LDPE+Orevac/Orgalloy/80/20 LDPE+Orevac | 390 | 20.8 | 13.2 | 8.3 | 334 | 235 | 123 | 107 | 460 | nd | nd |
| 9; Orgalloy/80/20 MDPE+ Orevac/MDPE | 390 | 24.4 | 13.1 | 13.8 | 257 | 396 | 50 | 143 | 600 | nd | nd |
| 10; PA-6/PP alloy | 1630 | 22 | 21.3 | 16.1 | 364 | 329 | 82 | 150 | 786 | 15.1 | 12.7 |
| 11; PA-6 | 1630 | 22 | 21.5 | 16.6 | 337 | 420 | 310 | 101 | 703 | 9.9 | 9.8 | nd: no data profiles were those associated with the Orgalloy alloy, in other words: in the extruder 230–250° C. at head: 240° C.

For each ground product two single-layer films of average thickness 50 μm were produced on this extruder, the PE added to the ground product being a LDPE of MI=0.3 in weight ratios of 25% and 50%.

The films were produced without any problem, showing no segregation, (with no arch formation at the feed discharge). The films obtained were fairly transparent, milky white, strong and moisture-free. The films obtained can have any required thickness, for example between 10 and 150 μm.

Material throughput is high, specifically 60 kg/h for screw speeds of 60 rpm to 110 rpm, demonstrating excellent extrudability together with an excellent ability to form films. Moreover, it is not necessary to extrude the mixture in a special screw such as a polyamide screw: there is no need to adapt polyolefin extrusion devices to receive a ground product of films obtained according to the invention.

The results of mechanical tests (tensile strength, tear resistance, dart test) carried out on films obtained from PE and films according to the invention show that these films have goods mechanical characteristics.

What is claimed is:
1. A film having low permeability to hydrocarbons consisting essentially of a central layer (i) formed of a polyamide/polyolefin alloy having a polyamide matrix, wherein the alloy further comprises a compatibility-ensuring agent and of two outer layers (ii) and (iii) each formed of polyolefin, in which said polyamide/polyolefin alloy is selected from the following alloys:

an alloy comprising, in % by weight, (a) 55 to 70% PA-6, (b) 5 to 15% of an ethylene/propylene copolymer, wherein the molar ratio of ethylene to propylene in the ethylene/propylene copolymer is<1, grafted with maleic anhydride then condensed with mono-amino oligomers of caprolactam; (c) made up to 100% with polypropylene;

an alloy comprising, in % by weight, (a) 55 to 70% PA-6, (b) 5 to 15% of at least one ethylene copolymer with (i) an alkyl (meth)acrylate or an unsaturated carboxylic acid vinyl ester and (ii) an unsaturated carboxylic acid anhydride or an unsaturated epoxy, monomer (ii) being grafted or copolymerized; (c) made up to 100% with polyethylene; and an alloy comprising, in % by weight, (a) 55 to 70% PA-6; (b) 5 to 15% polyethylene or copolymers of ethylene and an alpha-olefin grafted with maleic anhydride or glycidyl methacrylate; (c) made up to 100% with polyethylene.

2. The film according to claim 1, in which the polyolefin of said alloy and the polyolefin of at least one of said layers (ii) and (iii) are substantially identical.

3. The film according to claim 1, in which the polyolefin of at least one of said layers (ii) and (iii) is polyethylene.

4. The film according to claim 1, in which the polyolefin of at least one of said layers (ii) and (iii) comprises a maleic grafted polyethylene or a maleic grafted ethylene copolymer.

5. The film according to claim 1, in which at least one polyolefin layer consists of at least two polyolefin sublayers.

6. The film according to claim 1, wherein the permeability of the film to styrene is less than about $50 \times 10^{-9}$ g.cm/cm$^2$/hr.

7. The film according to claim 1, wherein the permeability to pentane of the film having a thickness of about 50 $\mu$m is less than or equal to about 0.7 g/m$^2$/24 hrs.

* * * * *